R. M. ANDERSON.
PRESSURE REGULATOR FOR INTERNAL COMBUSTION POWER PLANTS.
APPLICATION FILED AUG. 3, 1916.

1,358,812.

Patented Nov. 16, 1920.

Inventor
Raymond M. Anderson
By Brown, Hanson & Boettcher
Attorneys

UNITED STATES PATENT OFFICE.

RAYMOND M. ANDERSON, OF DETROIT, MICHIGAN, ASSIGNOR TO STROMBERG MOTOR DEVICES COMPANY, OF CHICAGO, ILLINOIS, A CORPORATION OF ILLINOIS.

PRESSURE-REGULATOR FOR INTERNAL-COMBUSTION POWER PLANTS.

1,358,812.      Specification of Letters Patent.     Patented Nov. 16, 1920.

Original application filed April 25, 1914, Serial No. 834,298. Divided and this application filed August 3, 1916. Serial No. 112,905.

*To all whom it may concern:*

Be it known that I, RAYMOND M. ANDERSON, a citizen of the United States, and resident of Detroit, in the county of Wayne and State of Michigan, have invented certain new and useful Improvements in Pressure-Regulators for Internal-Combustion Power Plants, of which the following is a full, clear, concise, and exact description, reference being had to the accompanying drawings, forming a part of this specification.

My invention relates to pressure regulators for internal combustion power plants for operation in conjunction with the carbureter and is concerned with certain improvements, to the end of producing a highly efficient mixture for combustion. This application is divisional of my co-pending application Serial Number 834298 filed April 25th, 1914, which has matured into Patent 1,333,149, Mar. 9, 1920.

While it can be seen that my invention may be used advantageously on either a constant speed engine or a variable speed engine, it will appear, as this description proceeds, that certain features are provided for taking care of varying conditions which are created by variations in the speed of the engine.

Since the passage of the outside air into the carbureting apparatus is due to the suction of the engine to which the carbureting apparatus is attached, there remain three fundamental things to consider in connection with the production and control of the combustible mixture, to-wit, the flow of the fuel, primarily in liquid form, such as gasolene, the temperature, and the pressure. Great difficulty has been heretofore encountered in attempts to create and maintain a certain mixture, that is, to create a certain mixture in a so-called carbureting chamber, where means is provided to control the proportions of the constituents thereof, and then to maintain that mixture until it reaches the engine cylinder or cylinders. By a series of careful experiments, I have learned that the main difficulties are due to conditions of the temperature and the pressure affecting the mixture after the mixture is formed in the carbureting chamber.

It is of course, desirable to make the controls automatic and, since it is much more difficult to secure automatic controls in connection with a variable speed engine, with the consequent varying conditions, I shall describe the use of my invention on a variable speed engine such as an automobile engine.

The variations in pressure on the engine side of the throttle are productive of very injurious results, unless properly compensated for, and this is due to the fact that, when the pressure on the engine side of the throttle is low and is suddenly increased, the fuel which happens to be at that point at that time in the gaseous state is precipitated and at just this time, when more fuel is needed for the engine, the air is robbed of the hydrocarbon. Added to this is the physical fact that the low pressure on the engine side of the throttle causes an expansion which cools the manifold so that the effect of condensing the fuel is augmented by the action of this other agent.

Since the relation of the suction to the speed depends upon the load, I shall refer to the varying effects in terms of suction, which affects the carbureter in the same way and to the same extent at any point, whether that suction is due to a decreased load and an increased speed, or whether it is due to an increased load and a decreased speed.

In the accompanying drawings.

Figure 1:
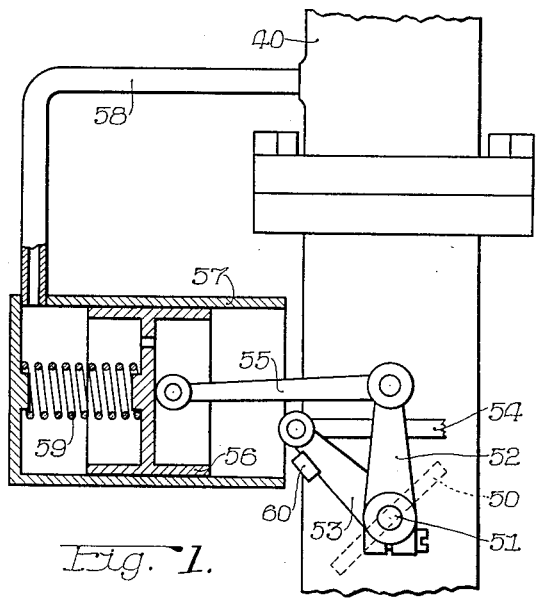
Figure 1 is a view illustrating my improved pressure regulating means.

In the coupling member 41, which leads from the carbureter C to the engine E, I provide a valve 50, which is a "manifold pressure regulator" and this may be controlled manually or automatically by means of the arrangement which I have illustrated in Fig. 1. It will be noted that the valve 50 is mounted upon a shaft 51, which has secured thereto an operating lever 52 and which has loosely mounted thereon another lever 53. The lever 53 is connected, by means of the rod 54, with the operator's control and the lever 52 is pivoted to a connecting rod 55 leading from a piston 56, mounted to reciprocate in a cylinder 57. The compartment on the closed side of the piston is connected by means of a pipe 58 with the intake manifold 40, as illustrated, and, if desired, a spring 59 is disposed between the piston and the end wall of the cylinder in order to overcome the friction of the piston and to make the piston more sensitive to the pressure which is in the manifold. It will now be clear that changes in pressure in the manifold above the valve 50 cause a movement of the piston 56 and a consequent compensating movement of the valve 50, so that a forced increase of pressure, which would cause the undesirable precipitation, is impossible.

It will be noted that the parts 55, 56, 57, 58 and 59 are, of course, properly applicable to the lever 52 of Fig. 1, where the lever 53 is not employed, since, in that arrangement, the manual throttling is taken care of at the barrel throttle. Fig. 1, therefore, shows not only the details of the automatic governing arrangement, which may be secured to the lever 52, but also shows a modification wherein the manual control may be applied directly to the valve 50. It will be noted that the lever 53 is provided with an engaging lug 60, which, when the operator's control is moved to close the valve 50, engages the lever 52 and effects the closing of the valve. However, when the lever 53 is thrown into open position, the valve 50 is under the control of the pressure operated means and saves the manifold against the sudden injurious increase in pressure, so as not to starve the engine temporarily and so that the engine may pick up evenly and quickly in a natural way.

Figure 2:
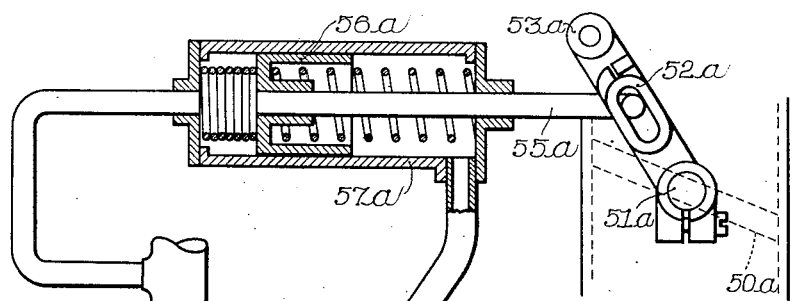
Fig. 2 is a modified form thereof.
Figure 3:
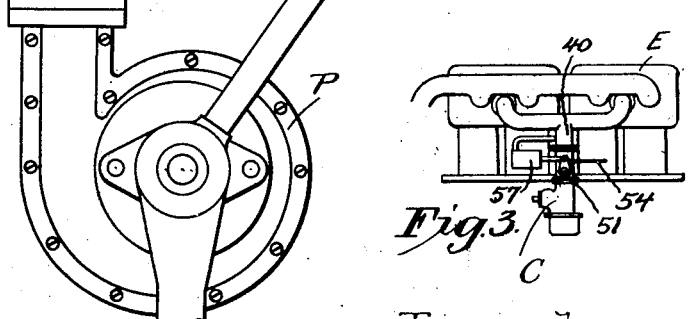
Fig. 3 shows the pressure regulating means in combination with an internal combustion engine and a carbureter.

In Fig. 2, I illustrate a modified form of control means. Here, I show the throttle 50ª, whose shaft 51ª is provided with the tight lever 52ª and the loose lever 53ª. The tight lever 52ª is connected by means of the rod 55ª with the piston 56ª in the cylinder 57ª. The opposite sides of this cylinder are connected with a water system which, for instance in an automobile, is operated by the engine and the connections are on opposite sides of the pump P so as to secure the effective pressure potential in the way of a governor. That is on one side of the piston the pressure is the same as that on one side of the pump and on the other side of the piston the pressure is the same as that on the other side of the pump. Thus, as the potential increases, the piston will move to the right and will tend to open the valve, while, when the conditions are reversed, it will tend to close the valve so as to prevent the sudden increase in pressure in the manifold as heretofore explained. It will be understood, of course, that the pressure regulators may occupy an indefinite number of positions and thus the manifold pressure may be regulated to a nicety.

The pressure-regulating means makes changes in pressure very gradual and, due to the fact that these gradual changes are carried on under a high temperature, they are ineffective in causing condensation of the hydrocarbon.

I claim as new and desire to secure by Letters Patent:

1. In combination, an internal combustion engine, a carbureter, a passageway leading from said carbureter to said engine, a valve in said passageway, means responsive to engine speed for opening said valve as said speed increases, and manually operated means effective when moved in one direction to move said valve in its closing direction and when moved in the opposite direction being independent of said valve, whereby when said manually operated means is at the limit of its movement in the latter direction said valve will be free to open automatically as the speed increases.

2. In combination, an internal combustion engine, a carbureter, a passageway leading from said carbureter to said engine, a valve in said passageway, means responsive to the pressure in said passageway on the engine side of said valve for opening said valve as the pressure in said passageway on the engine side of said valve decreases, and manually operated means effective when moved in one direction to move said valve in its closing direction and when moved in the opposite direction being independent of said valve, whereby when said manually operated means is at the limit of its movement in the latter direction said valve will be free to open automatically as the pressure in said passageway on the engine side of said valve decreases.

3. In combination, an internal combustion engine, a carbureter, a passageway leading from said carbureter to said engine, a valve in said passageway, means responsive through a restricted conduit to the pressure in said passageway on the engine side of said valve for opening said valve as the pressure in said passageway on the engine side of said valve decreases, and manually operated means effective when moved in one direction to move said valve in its closing direction and when moved in the opposite direction being independent of said valve, whereby when said manually operated means is at the limit of its movement in the latter direction said valve will be free to open automatically as the pressure in said passageway on the engine side of said valve decreases.

4. In combination, a pipe, a shaft in said pipe, a butterfly valve on said shaft in said pipe, a lever on said shaft outside said pipe, a cylinder, a piston in said cylinder and connected with said lever, one side of said piston being open to the atmosphere and the other side being exposed to the pressure in said pipe, decrease of pressure in said pipe opening said valve, a second lever on said shaft outside said pipe, means for manually operating said second lever, and means on said second lever to engage said first lever to close said valve.

In witness whereof, I hereunto subscribe my name this 21st day of July, A. D. 1916.

RAYMOND M. ANDERSON.